(12) United States Patent
Tinsley et al.

(10) Patent No.: US 11,343,639 B2
(45) Date of Patent: May 24, 2022

(54) SYSTEM AND METHOD FOR VEHICLE LOCATION ANONYMIZATION

(71) Applicant: Xevo Inc., Bellevue, WA (US)

(72) Inventors: Bryan Patrick Tinsley, Kenmore, WA (US); Cameron Carson Hatfield, Kirkland, WA (US); Michael Shawn Garlick, Renton, WA (US)

(73) Assignee: XEVO INC., Bellevue, WA (US)

( * ) Notice: Subject to any disclaimer, the term of this patent is extended or adjusted under 35 U.S.C. 154(b) by 30 days.

(21) Appl. No.: 17/081,660

(22) Filed: Oct. 27, 2020

(65) Prior Publication Data

US 2022/0109947 A1   Apr. 7, 2022

Related U.S. Application Data

(60) Provisional application No. 63/086,492, filed on Oct. 1, 2020.

(51) Int. Cl.
| | |
|---|---|
| *H04W 4/021* | (2018.01) |
| *G01C 21/34* | (2006.01) |
| *H04W 4/44* | (2018.01) |
| *H04W 4/02* | (2018.01) |
| *H04W 12/00* | (2021.01) |

(52) U.S. Cl.
CPC ........ *H04W 4/022* (2013.01); *G01C 21/3476* (2013.01); *H04W 4/023* (2013.01); *H04W 4/44* (2018.02); *H04W 12/00* (2013.01)

(58) Field of Classification Search
CPC ... H04W 12/02; H04W 4/023; G06F 21/6254; G06F 21/60
See application file for complete search history.

(56) References Cited

U.S. PATENT DOCUMENTS

| | | | |
|---|---|---|---|
| 8,494,549 B1* | 7/2013 | Pillai ................. | G06Q 30/0261 455/456.1 |
| 9,867,041 B2* | 1/2018 | Xiong ................... | H04W 4/029 |
| 2018/0109916 A1 | 4/2018 | Sprogis | |
| 2019/0051062 A1 | 2/2019 | Mueck | |
| 2020/0126418 A1 | 4/2020 | Nangeroni et al. | |
| 2020/0252794 A1* | 8/2020 | Milton ............... | H04W 12/033 |

OTHER PUBLICATIONS

ARTICLE29 Newsroom, Article 29 Working Party, European Commission Justice and Consumers, accessed Dec. 14, 2020, 4 pages.
(Continued)

*Primary Examiner* — Benyam Haile
(74) *Attorney, Agent, or Firm* — Seed IP Law Group LLP

(57) ABSTRACT

Embodiments are directed towards a system and method of anonymizing vehicle location data by using a centralized location of entities near the vehicle instead of the actual vehicle location. One or more entities are selected within a threshold radius around the vehicle. The centralized location is determined based on publicly available entity location information for the selected entities. The centralized location is stored or transmitted to third parties as the vehicle's location. A characteristic of the vehicle or a time range associated with capturing the actual vehicle location may be associated with the centralized location without including an identifier of the vehicle.

20 Claims, 5 Drawing Sheets

(56) References Cited

OTHER PUBLICATIONS

International Search Report and Written Opinion for PCT Application No. PCT/US2021/053017, dated Jan. 11, 2022, 10 pages.
Lubowicka, "The ultimate guide to data anonymization in analytics [updated]," Piwik PRO, Dec. 13, 2018, accessed Dec. 14, 2020, 15 pages.
Wes, "Looking to comply with GDPR? Here's a primer on anonymization and pseudonymization," International Association of Privacy Professionals, Apr. 25, 2017, 3 pages.

* cited by examiner

SYSTEM AND METHOD FOR VEHICLE LOCATION ANONYMIZATION

BACKGROUND

Technical Field

The present disclosure relates generally to anonymization of vehicle location data using entity location data.

Description of the Related Art

Automobiles are becoming more and more user friendly and interactive. Many new cars are now manufactured with a computer or digital user interface, called a head unit, which a user can use to control various aspects of the automobile and access a variety of content or applications. For example, the user can use the head unit to change radio stations, change the temperature of the automobile cabin, access maps and global positioning systems, access the internet, access other head-unit applications, or access or control other accessories of the automobile.

The head unit can also provide various types of information or content to the user, such as when the automobile is due for an oil change or restaurants that are nearby. In some situations, the vehicle's location or movement can be used to select such content. Unfortunately, privacy rights and laws can be hurdles for obtaining the vehicle's location data to provide accurate or target content to the user.

BRIEF SUMMARY

Briefly stated, embodiments are directed towards a system and method utilizing location data of public entities that are near a vehicle to create an anonymized location for the vehicle. In this way, information regarding a vehicle being in a given area can be obtained and used without maintaining or using the vehicle's true location or identity.

In general, a location of a vehicle is determined. One or more public entities within a threshold distance from the vehicle location are determined. A centralized location of the one or more selected entities can be determined based on an entity location of the one or more selected public entities. The centralized location is then stored, maintained, or used as an anonymized location of the vehicle without storing the obtained vehicle location.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

DETAILED DESCRIPTION

Figure 1:
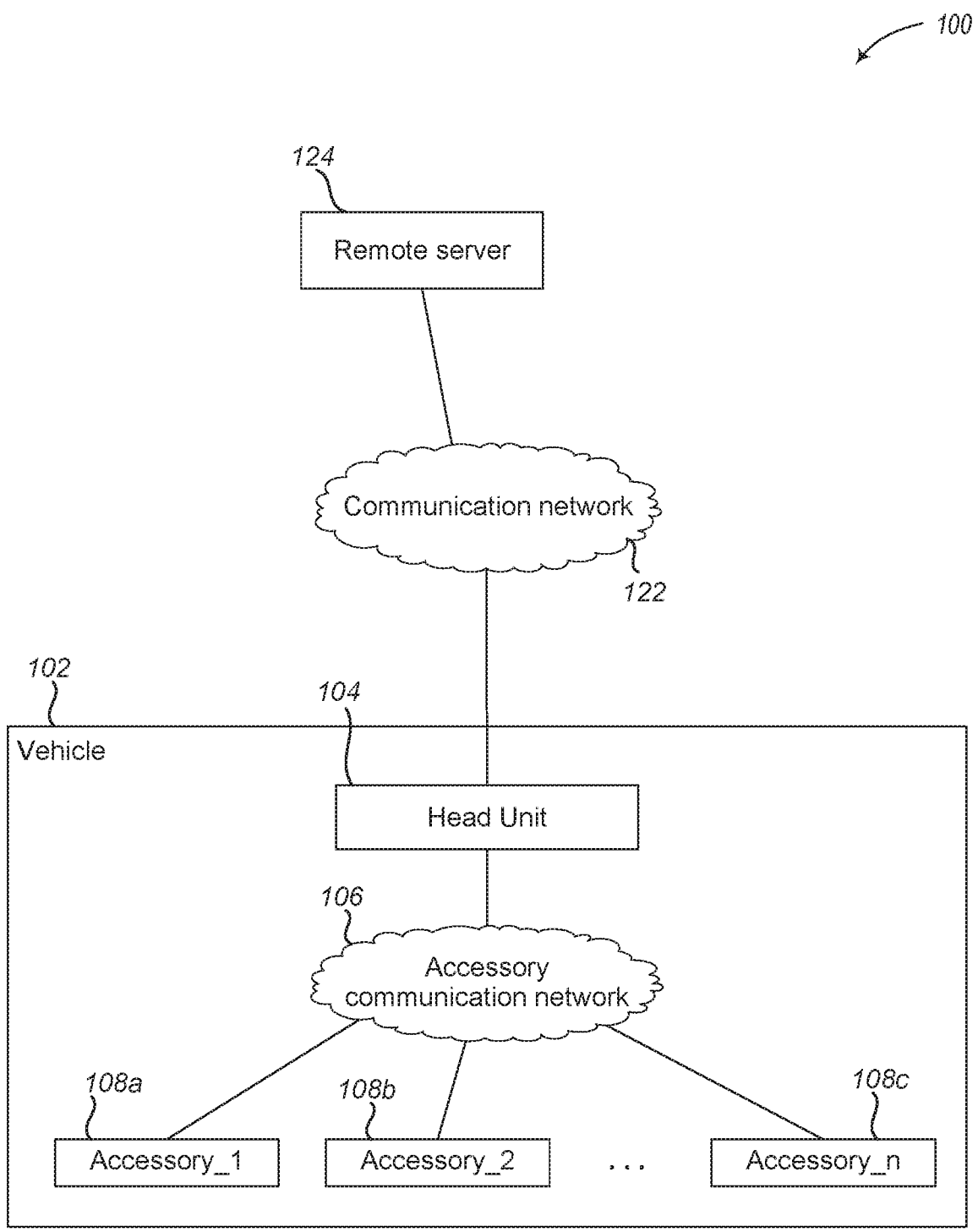
FIG. 1 illustrates a context diagram of a vehicle environment that communicates with a remote server to anonymize vehicle location data in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The term "vehicle" is defined as a device used to transport people or goods (or both), and examples include automobiles, buses, aircraft, boats, or trains. Although most of the following text focuses on an automobile, the application of the concepts described herein is not limited to such a vehicle, and embodiments can be utilized in other devices with networking capabilities for which bandwidth usage is a leading concern. A "processor" is defined as a component with at least some circuitry or other hardware that can execute instructions. A "head unit" is defined as one or more components, whether part of a single unit or a collection of units, at least some of which include circuitry, configured to perform computations related to image processing or present content arising from the image processing (or both).

The term "user" is defined as a person or occupant that is in or otherwise transported by a vehicle or in control of the vehicle. The user may be the driver or a passenger of an automobile. The term "content" is defined as information related to an object that can be presented to a user of the vehicle. Content may include visual content, audio content, tactile content, or some combination thereof.

The term "entity" or "public entity" is defined as an object whose location is known to the public. Examples of public entities include, but are not limited to, restaurants, gas stations, brick-and-mortar retail stores, government buildings, parks, traffic cameras, cellular towers, etc. Public entities are often stationary, but mobile public entities may also be used (e.g., public buses). In various embodiments, public entities publish their location information, also referred to as entity location information or data, which may be stored in one or more entity location databases.

FIG. 1 illustrates a context diagram of a vehicle environment 100 that communicates with a remote server to anonymize vehicle location data in accordance with embodiments described herein. Environment 100 includes a vehicle 102 and a remote server 124.

Embodiments described herein utilize vehicle location information and public entity location information to generate an anonymized location for the vehicle 102. Currently, some vehicles share location information with third parties. These third parties can use this vehicle location information to detect driving habits and to provide content to the user of the vehicles. For example, assume the vehicle travels a specific route Monday through Friday starting at 9:00 AM and the vehicle stops at a particular coffee shop. The third party can predict that next Tuesday, the vehicle will again stop at the coffee shop. This prediction can be used to provide a targeted advertisement or other information to the user of the vehicle. Unfortunately, providing true or actual vehicle location information to a third party can violate some privacy laws.

Utilization of publicly available information of public entities near the vehicle can be used as an anonymized location of the vehicle instead of the current location of the vehicle. Third parties can use the anonymized locations of multiple vehicles to detect aggregated patterns of vehicles. The third parties can select content based on these aggregated patterns and provide the selected content to vehicles in the same general area (e.g., within 0.5 kilometers) as the anonymized locations.

The vehicle 102 has a head unit 104 and one or more accessories 108a-108c. The vehicle 102 is virtually any means of transportation that includes a computing device and an output interface to provide content to a user of the vehicle 102. In the illustrative examples described herein, the computing device of the vehicle is the head unit 104, although other types of computing devices may be employed. Moreover, examples of vehicles include automobiles, aerial vehicles, water vessels, railroad vehicles, and other modes of transportation.

The head unit 104 is a computing device that provides content, interactive controls, user interfaces, or other information to users of the vehicle 102. As an illustrative example, the head unit 104 may provide a navigation interface, audio and radio controls, environmental controls, automobile performance or maintenance information, or other types of content. In various embodiments, the head unit 104 may present content to a user, such as recommendations or advertisements provided by the remote server 124. For example, the recommendation may be an advertisement for a clothing store that is near the vehicle's current location. In this example, the remote server 124 may provide the advertisement recommendation to the head unit 104 for the head unit 104 to display.

In some embodiments, the head unit 104 may determine a centralized location of one or more public entities that are near the vehicle 102. The head unit 104 can generate an anonymized location of the vehicle 102 using this centralized location. The head unit 104 can then store the anonymized location or provide it to the remote server 124. As discussed herein, the head unit 104 can obtain a current location of the vehicle 102, such as via a GPS sensor, which may be an accessory 108. The head unit 104 can then access a database of known locations for a plurality of public entities. The head unit 104 can select a threshold number of closest public entities and aggregate or average their locations to determine the centralized location. In some embodiments, the head unit 104 can communicate with the remote server 124 to obtain the public entity database. In some embodiments, the head unit 104 may not determine its anonymized location, rather it may provide its current location to the remote server 124, and the remote server 124 can determine the anonymized location, as described herein.

The accessories 108a-108c can be any device or process that provides information or data directly or indirectly (such as via the head unit 104) to the user. Examples include the following: gas-level gauge, speedometer, odometer, oil-pressure gauge, temperature gauge, tire-pressure gauge, GPS device, ignition-status indicator, gear-shift mechanics or electronics indicating a gear state or change of state, seat-belt-status indicator, seat-weight sensors, clock, or other vehicle sensor that provides information to a user.

One or more of the accessories 108a-108c, e.g., a vehicle location device, may provide collected information to the head unit 104 via an accessory communication network 106. In some embodiments, the head unit 104 may control one or more of the accessories 108a-108c by providing information or instructions to the accessories via the accessory communication network 106. The accessory communication network 106 may include one or more physical networks; one or more wireless communication networks; one or more application program interfaces; or one or more other networks capable of transmitting data from one accessory to another, from an accessory to the head unit 104, or from the head unit to an accessory; or some combination thereof depending on the types of accessories communicating with the head unit 104. For example, the accessory communication network 106 may include an automotive body communication network, such as a wired controller area network, short-range wireless communication network, such as personal-area networks utilizing Bluetooth Low Energy protocols, or any other type of network.

The remote server 124 is any combination of computing devices, such as one or more servers or other cloud resources, which is remote to the vehicle 102. In some embodiments, the remote server 124 is a public entity location database, or can access such a database, and can provide public entity location information to the head unit 104. In other embodiments, the remote server 124 is a third party server, or can provide information to a third party server, and can receive an anonymized location generated by the head unit 104. In at least one such embodiment, the remote server 124 can aggregate anonymized locations from a plurality of vehicles 102 to generate aggregated location information that can be used to generate content recommendations for various different geographical areas. In yet other embodiments, the remote server 124 may itself determine the anonymized location of the vehicle 102, as described herein.

Although the remote server 124 is illustrated as a single device, embodiments are not so limited. Rather, the remote server 124 may be one or more computer devices that perform one or more functions. In various embodiments, the remote server 124 may include one computing device or a plurality of computing devices, but may be generally referred to herein as a remote server.

In some embodiments, the remote server 124 and the head unit 104 communicate with each other via a communication network 122. The communication network 122 is configured to couple various computing devices to transmit data from one or more devices to one or more other devices. Communication network 122 includes various wireless networks that may be employed using various forms of communication technologies and topologies, such as, but not limited to, cellular networks, mesh networks, or the like.

Figure 2:
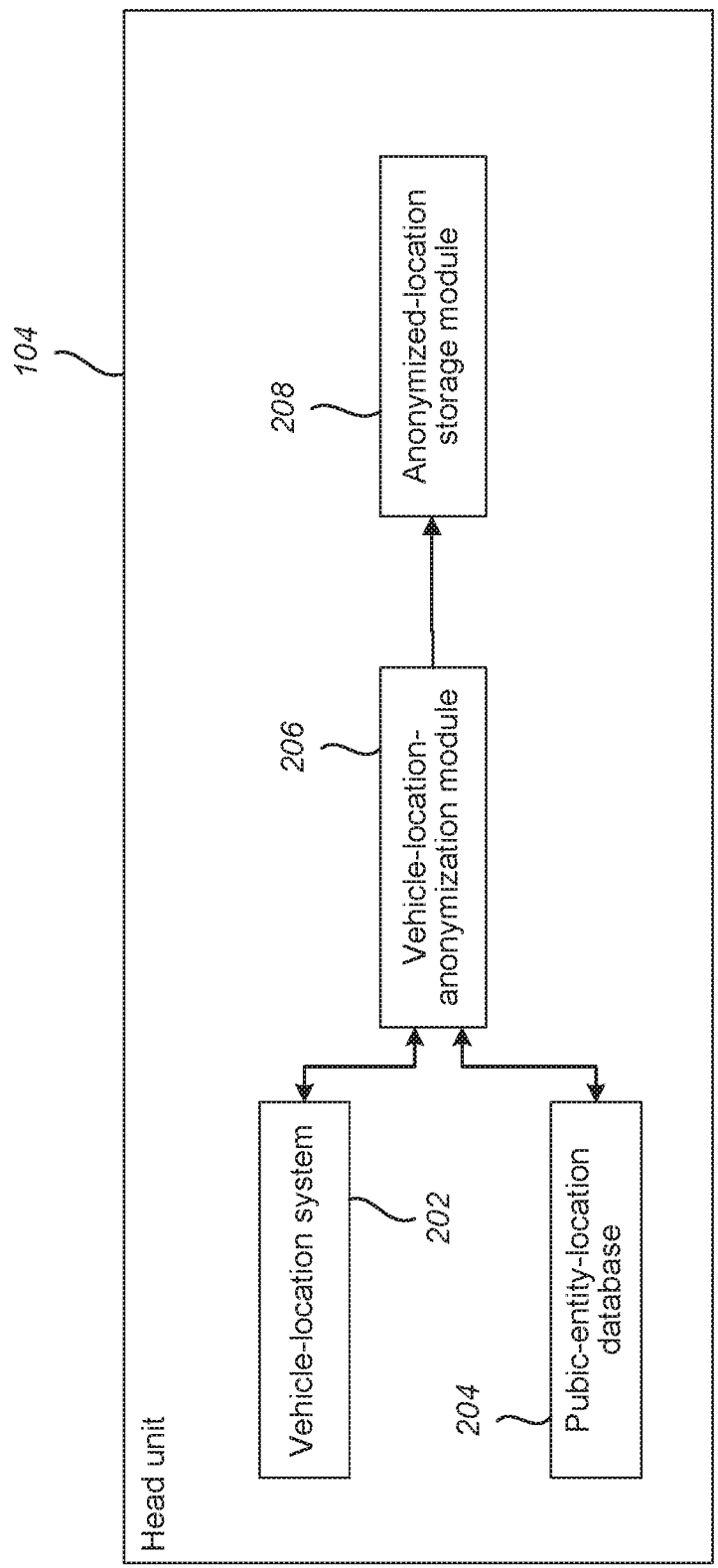
FIG. 2 illustrates a block diagram of a use case computer device example for anonymizing vehicle location data in accordance with embodiments described herein.

FIG. 2 illustrates a block diagram of a use-case computer device example for anonymizing vehicle location data in accordance with embodiments described herein. In this illustrative example, the use-case computer device is a head unit 104 of a vehicle 102 from FIG. 1. The head unit 104 includes a vehicle-location system 202, a public-entity-location database 204, a vehicle-location-anonymization module 206, and an anonymized-location storage module 208.

The vehicle-location system 202 is configured to determine a current location of the vehicle. In some embodiments, the vehicle-location system 202 includes a GPS receiver system or other location-based system that determines or calculates the current location of the vehicle, such as latitude and longitude. In other embodiments, the vehicle-location system 202 communicates with another system separate from the head unit 104, such as an accessory 108 in FIG. 1, to request or obtain the current location of the vehicle.

The public-entity-location database 204 is configured to maintain or manage location information for a plurality of public entities. In some embodiments, the public-entity-location database 204 itself stores the public entity location information. In other embodiments, the public-entity-location database 204 communicates with another system separate from the head unit 104, such as a remote server 124 in FIG. 1, to request or obtain the public entity location information.

The vehicle-location-anonymization module 206 is configured to generate an anonymized location for the vehicle. In some embodiments, the vehicle-location-anonymization module 206 sends a request to the vehicle-location system 202 to obtain a current location of the vehicle from the vehicle-location system 202. The vehicle-location-anonymization module 206 may then determine a threshold radius from the current location of the vehicle. The vehicle-location-anonymization module 206 can then send a request or query to the public-entity-location database 204 for entity location information within the threshold radius. The public-entity-location database 204 can return a list of entity locations for one or more public entities that are within the threshold radius from the vehicle.

The vehicle-location-anonymization module 206 can select a threshold number of those public entities within the threshold radius. The vehicle-location-anonymization module 206 utilizes the entity locations for the selected entities to generate or calculate a centralized location of the selected entities. The vehicle-location-anonymization module 206 provides the centralized location to the anonymized-location storage module 208 as an anonymized location of the vehicle.

The anonymized-location storage module 208 is configured to store or maintain the anonymized location. In some embodiments, the anonymized-location storage module 208 may transmit the anonymized location to another computing system, such as remote server 124 in FIG. 1.

Although FIG. 2 illustrates the vehicle-location system 202, the public-entity-location database 204, the vehicle-location-anonymization module 206, and the anonymized-location storage module 208 as being part of or executed by the head unit 104, embodiments are not so limited. In other embodiments, the vehicle-location system 202, the public-entity-location database 204, the vehicle-location-anonymization module 206, the anonymized-location storage module 208, or some combination thereof may be executed by another computing system, such as remote server 124 in FIG. 1.

The operation of certain aspects of the disclosure will now be described with respect to FIG. 3. In at least one of various embodiments, process 300 described in conjunction with FIG. 3 may be implemented by or executed by a system of one or more computing devices, such as head unit 104 or remote server 124 in FIG. 1.

Figure 3:
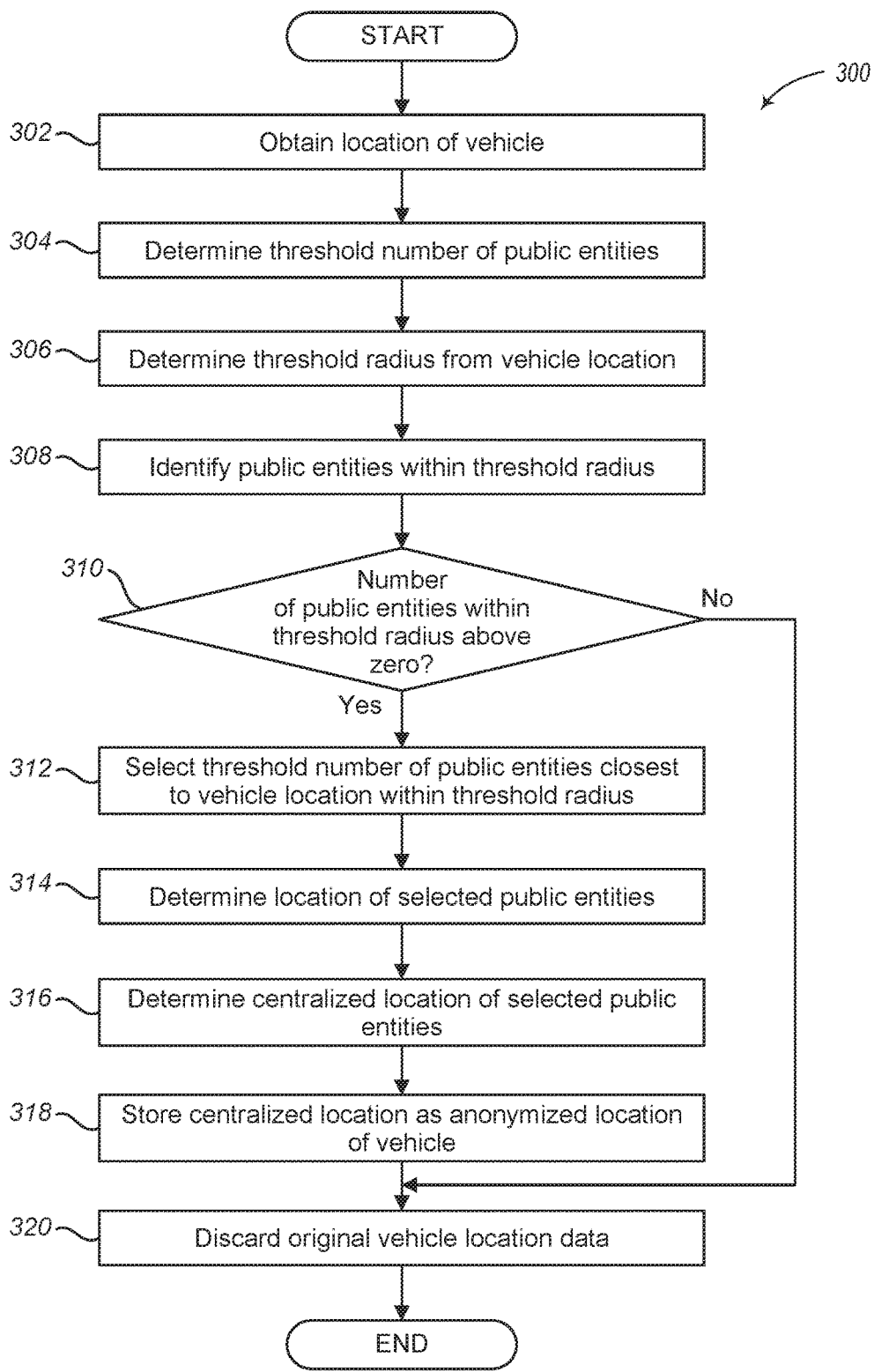
FIG. 3 illustrates a logical flow diagram generally showing one embodiment of a process for using public entity location information to determine a centralized location to use as the vehicle's anonymized location in accordance with embodiments described herein.

FIG. 3 illustrates a logical flow diagram generally showing one embodiment of a process 300 for using public entity location information to determine a centralized location to use as the vehicle's anonymized location in accordance with embodiments described herein.

Process 300 begins, after a start block, at block 302, where a location of vehicle is obtained. As discussed above, the vehicle location may be obtained from a GPS system or other coordinate-based location system on the vehicle. For example, the vehicle location may be a current latitude and longitude of the vehicle.

In some embodiments, the vehicle location may include other information associated with the vehicle. This other vehicle information may include a vehicle identifier, make or model of the vehicle, demographic information of the driver of the vehicle, etc.

In various embodiments, the vehicle location is obtained when the vehicle enters or is in a start condition, such as when the vehicle's ignition is turned on. In other embodiments, the vehicle location may be obtained periodically or at randomly selected times. By determining the vehicle's location on start-up, various information associated with the vehicle can be obtained, such as possible stores or businesses that the driver visited or driving trends. However, using the vehicle's actual location may violate privacy laws, and is thus anonymized, as described herein.

Process 300 proceeds to block 304, where a threshold number of public entities is determined. In various embodiments, threshold number of public entities is selected by a developer or an administrator. For example, this threshold may be three public entities. In this way, entity location information from a statistically significant number of public entities can be used to calculate the anonymized location of the vehicle, as discussed herein, but without burdening the system with too much data. Moreover, the anonymized location is used as an estimated location of the vehicle, and thus, does not need to rely on high numbers of entity locations to be valuable in anonymizing the vehicle's data. Accordingly, using entity location data from three entities may provide the same amount of anonymization of the vehicle's data as using entity location data for six.

In some embodiments, the entity threshold number is static and does not change until a new entity threshold number is selected by an administrator. In other embodiments, the entity threshold number is dynamic and changes based on various operating parameters. For example, in at least one embodiment, if the number of public entities within the threshold radius does not satisfy the threshold number of public entities, then the entity threshold number may be decreased.

In various embodiments, the entity threshold number may be a number range, such as one to three entities. Moreover, the entity threshold number may include specific types of public entities. For example, in some embodiments, only public businesses may be used (e.g., restaurants, gas stations, supermarkets, etc.). In other embodiments, only government locations may be used (e.g., state driver license offices, city parks, police stations, etc.).

Process 300 continues to block 306, where a threshold radius from the vehicle location is determined. In some embodiments, the threshold radius may be selected by a developer or administrator. For example, the threshold radius may be set to 0.2 kilometers. In other embodiments, the threshold radius may be selected by the driver or a user of the vehicle. In this way, the driver is given some control on how anonymous their data will be.

In some embodiments, the threshold radius is static and does not change until a new threshold radius is selected by an administrator. In other embodiments, the threshold radius is dynamic and changes based on various operating parameters. For example, in at least one embodiment, if the number of public entities within the threshold radius does not satisfy the threshold number of public entities, then the threshold radius may be increased to meet the threshold number of public entities. In another example, if the number of public entities within the threshold radius exceeds a maximum threshold, then the threshold radius may be reduced.

In some other embodiments, the threshold radius may change based on a zone in which the vehicle is currently located. For example, if the vehicle is in a residential area or other exclusion zone, then the threshold radius may be set to zero to ensure that no public entities are identified in the threshold radius, which as discussed below will result in the original vehicle location data being discarded because it cannot be anonymized.

Process 300 proceeds next to block 308, where public entities within the threshold radius from the vehicle location are identified. In some embodiments, a database of public entities and their locations is queried using the vehicle's location and the threshold radius to identify those public entities that are within the threshold radius from the vehicle. Public entities that do not include entity location information, e.g., do not include latitude and longitude, may be excluded and not identified.

In various embodiments, other criteria or characteristics of the public entities may be used to identify entities within the threshold radius. For example, if the entity threshold number is for a particular type of public entities, e.g., restaurants and gas stations, then those types of public entities within the threshold radius from the vehicle are identified and other types of public entities are ignored.

Process 300 continues next at decision block 310, where a determination is made as to whether the number of public entities within the threshold radius is above zero. If no public entities are identified at block 308, then the system may consider the vehicle to be in an exclusion zone, such as a residential area, and process 300 flows to block 320 to discard the vehicle's location data. In this way, vehicles that start up in residential areas are not included in the vehicle location data; otherwise, the system could identify home areas and possibly addresses, which could violate privacy laws.

If there are more than zero public entities within the threshold radius, then process 300 flows from decision block 310 to block 312.

At block 312, the threshold number of public entities closest to the vehicle location within the threshold radius are selected. For example, assume there are four public entities within the threshold radius of the vehicle, but the entity threshold number is three. The three closest public entities to the vehicles are selected, which is further demonstrated in FIGS. 4A-4B. As another example, if the entity threshold number is the range of one to three and there are two public entities within the threshold radius, then both public entities are selected.

In some other embodiments, one or more clustering algorithms or mechanisms may be used to select the public entities closest to the vehicle location. For example, assume the entity threshold number is three and there are seven public entities within a threshold radius of 0.8 kilometers. If five of those public entities are within a 0.2 kilometer diameter area of one another, then the three closest public entities from the cluster of five may be selected, even if one of the non-clustered entities is closer to the vehicle.

Process 300 proceeds to block 314, where an entity location of the selected public entities is determined. In various embodiments, a database of public entities and their locations is queried to determine the entity locations of the selected public entities. As mentioned herein, the entity location may be a publicly disclosed or shared longitude and latitude of the public entity.

Process 300 continues at block 316, where a centralized location of the selected public entities is determined. In various embodiments, the longitude of the selected public entities is averaged to calculate a centralized longitude and the latitude of the selected public entities is averaged to calculate a centralized latitude. The centralized longitude and centralized latitude are then used as the centralized location. Although embodiments described herein utilize the term centralized location, other terms may also be used to represent the modified, adjusted, or anonymized location of the vehicle.

Process 300 proceeds next to block 318, where the centralized location is stored as the vehicle's anonymized location without storing the original or actual vehicle location. In some embodiments, the anonymized location is stored with an identifier of the vehicle. In other embodiments, the anonymized location is stored without storing an identifier of the vehicle. In at least one embodiment, the anonymized location is stored with other characteristics of the vehicle. For example, the vehicle make or model may be stored with the anonymized location. In yet other embodiments, demographic information of the driver may be stored with the anonymized location.

In various embodiments, the anonymized location is stored with a time associated with when the original vehicle location was obtained. For example, in some embodiments, a 15 minute range or time window is associated with the anonymized location. This time window further anonymizes the vehicle and driver information, which can allow it to be combined with other vehicle or driver information into time buckets.

After block 318, or if there are zero public entities within the threshold radius as determined at decision block 310, process 300 continues next at block 320. At block 320, the original vehicle location data obtained at block 302 is discarded. In this way, the personal or private location information associated with the vehicle is removed, which allows the anonymized location to be used independent of a direct relationship to the vehicle or driver.

After block 320, process 300 terminates or otherwise returns to a calling process to perform other actions.

Figure 4A:
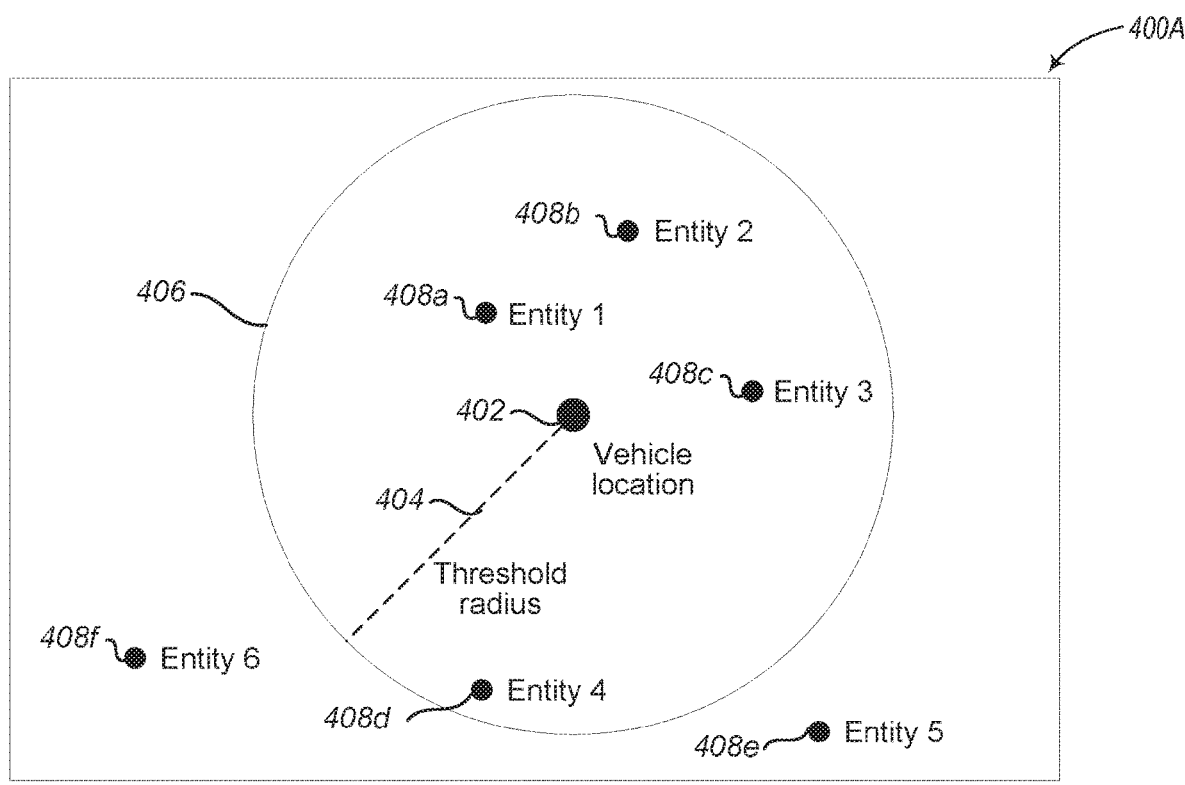
FIGS. 4A-4B show a use-case illustration of determining an anonymized vehicle location in accordance with embodiments described herein.
Figure 4B:
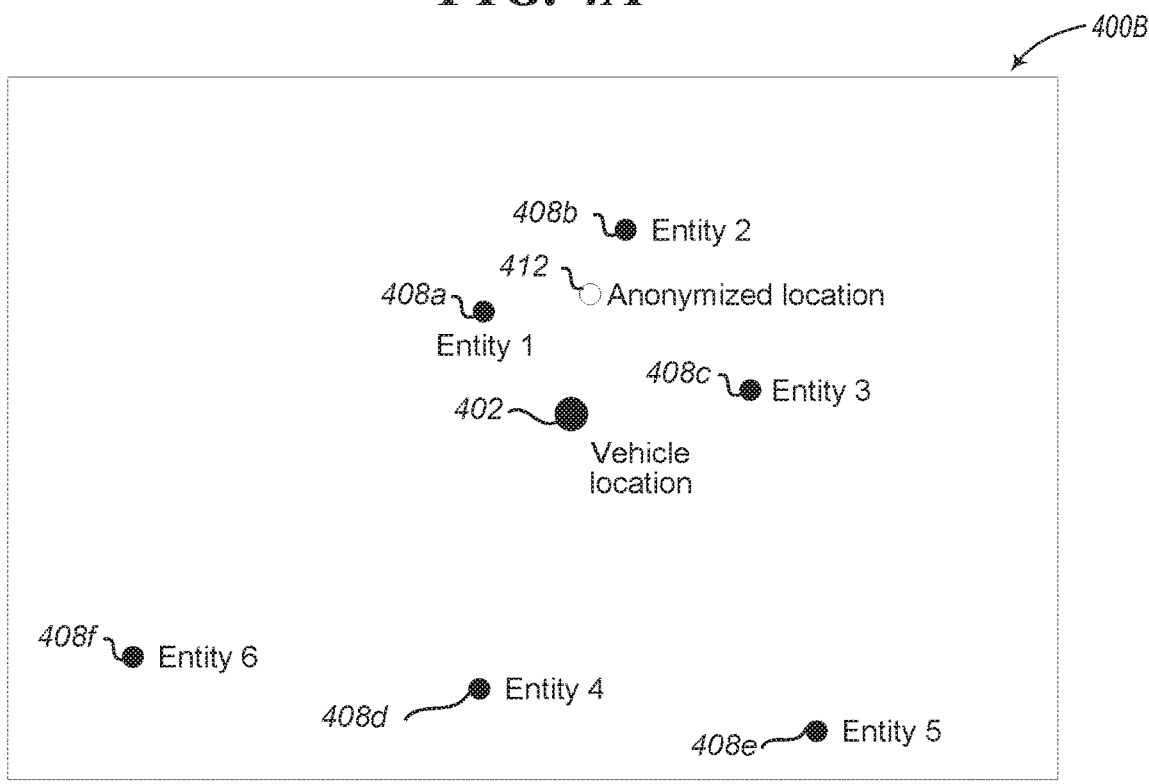

FIGS. 4A-4B show a use-case illustration of determining and using an anonymized vehicle location in accordance with embodiments described herein.

Example 400A in FIG. 4A illustrates a threshold radius 404 from a vehicle location 402. As discussed herein, the vehicle location 402 may have been obtained by a vehicle head unit in response to the vehicle being turned on. The threshold radius 404 creates an area-of-interest 406 in which to identify public entities. In this example, there are six public entities 408a-408f, where public entities 408a-408d are within the threshold radius 404, and are thus in the area-of-interest 406, and where public entities 408e-408f are outside the threshold radius 404.

As described here, a threshold number of entities is determined, which is used to select corresponding public entities to use for calculating the centralized location of the public entities. Assuming the entity threshold number is three, the three closest public entities 408 to the vehicle location 402 are selected. In this example, public entities 408a-408c are the three public entities 408 within the threshold radius 404 and closest to the vehicle location 402.

Publicly available location information is obtained for public entities 408a-408c in this example. This entity location information is aggregated and averaged to generate a centralized location to be used as an anonymized location of the vehicle, which is shown in FIG. 4B.

Example 400B in FIG. 4B illustrates the anonymized location 412 that is set from the centralized location calculated from the public location information for public entities 408a-408c. The anonymized location 412 is used as the location for the vehicle instead of the vehicle location 402.

Figure 5:
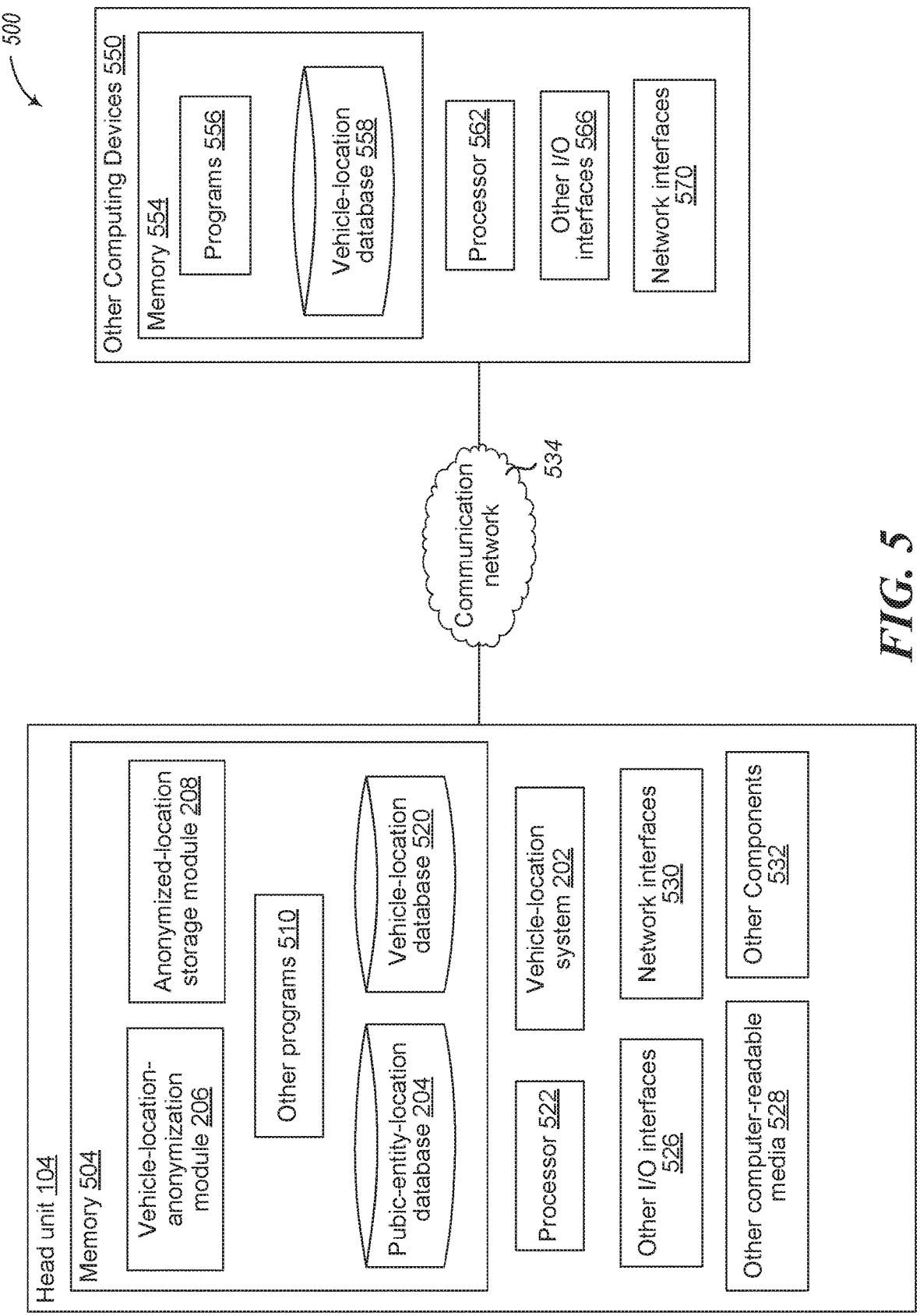
FIG. 5 shows a system diagram that describes one implementation of computing systems for implementing embodiments described herein.

FIG. 5 shows a system diagram that describes one implementation of computing systems for implementing embodiments described herein. System 500 includes head unit 104 and one or more other computing devices 550.

As described herein, the head unit 104 is a computing device that can perform functionality described herein for using entity location data to determine an anonymized location for a vehicle. One or more special purpose computing systems may be used to implement the head unit 104. Accordingly, various embodiments described herein may be implemented in software, hardware, firmware, or in some combination thereof. The head unit 104 includes vehicle-location system 202, memory 504, one or more processors 522, other input/output (I/O) interfaces 526, other computer-readable media 528, network interface 530, and other components 532.

The vehicle-location system 202 provides functionality to calculate, determine, or obtain a current, original, or actual location of the vehicle, as described herein.

Processor 522 includes one or more processing devices that execute computer instructions to perform actions, including at least some embodiments described herein. In various embodiments, the processor 522 may include one or more central processing units ("CPU"), programmable logic, or other processing circuitry.

Memory 504 may include one or more various types of non-volatile and/or volatile storage technologies. Examples of memory 504 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 504 may be utilized to store information, including computer-readable instructions that are utilized by processor 522 to perform actions, including at least some embodiments described herein.

Memory 504 may have stored thereon various modules, such as vehicle-location-anonymization module 206 and anonymized-location storage module 208. The vehicle-location-anonymization module 206 utilizes vehicle location information (e.g., a vehicle location obtained by the vehicle-location system 202) to select entities near the vehicle and determine a centralized location based on the publicly available location of the selected entities and set it as an anonymized location for the vehicle, as described herein. The vehicle-location-anonymization module 206 may obtain entity information from the public-entity-location database 204 that is local to the head unit 104 or from a remote server (e.g., other computing devices 550). The anonymized-location storage module 208 stores or transmits the determined anonymized location for the vehicle to a database (e.g., vehicle-location database 520) or to third parties (e.g., other computing devices 550).

Memory 504 may include a public-entity-location database 204 and a vehicle-location database 520. The public-entity-location database 204 stores publicly available location information for a plurality of entities, as described herein. In some embodiments, the public-entity-location database 204 may receive or obtain entity location information from other computing devices 550 or other databases (e.g., secretary of state business registries, government public entity databases, parks and recreation databases, etc.) that are remote from the head unit 104. The vehicle-location database 520 may store the anonymized location determined for the vehicle, as described herein.

Memory 504 may also store other programs 510. The other programs 510 may include operating systems, user applications, or other computer programs.

I/O interfaces 526 may include interfaces for various other input or output devices, such as audio interfaces, other video interfaces, USB interfaces, physical buttons, keyboards, haptic interfaces, tactile interfaces, or the like.

Other computer-readable media 528 may include other types of stationary or removable computer-readable media, such as removable flash drives, external hard drives, or the like.

Network interfaces 530 are configured to communicate with other computing devices, such as the other computing devices 550, via a communication network 534. Network interfaces 530 include transmitters and receivers (not illustrated) to send and receive data as described herein. The communication network 534 may include the communication network 122 of FIG. 1.

The other computing devices 550 are computing devices that are remote from the head unit 104. In some embodiments, the other computing devices 550 may include databases or third party servers that can provide entity information, utilize anonymized location information determined by the head unit 104, or determine the anonymized locations of vehicles itself based on vehicle location data received from the vehicles. The other computing devices 550 may include remote server 124 of FIG. 1 or other computing devices.

One or more special-purpose computing systems may be used to implement the other computing devices 550. Accordingly, various embodiments described herein may be implemented in software, hardware, firmware, or in some combination thereof.

The other computing devices 550 include memory 554, one or more processors 562, I/O interfaces 566, and network interface 570, which may be similar to, include similar components, or incorporate embodiments of memory 504, processor 522, I/O interfaces 526, and network interface 530 of head unit 104, respectively. Thus, processor 562 includes one or more processing devices that execute computer instructions to perform actions, including at least some embodiments described herein. In various embodiments, the processor 562 may include one or more CPUs, programmable logic, or other processing circuitry.

Memory 554 may include one or more various types of non-volatile and/or volatile storage technologies. Memory 554 may be utilized to store information, including computer-readable instructions that are utilized by processor 562 to perform actions, including at least some embodiments described herein. Memory 554 may store vehicle-location database 558 to store anonymized location information for one or more vehicles, as described herein. In some embodiments, the other computing devices 550 receive the anonymized location information from the head units 104 of one or more vehicles. In other embodiments, the memory 554 may include other modules (not illustrated) similar to the vehicle-location-anonymization module 206 or the anonymized-location storage module 208 of the head unit 104 to obtain vehicle location information from vehicles to determine the anonymized locations of vehicles, as described herein.

Memory 554 may also store other programs 556, which may include operating systems or other applications.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A computing device, comprising:
   at least one memory that stores computer instructions; and
   at least one processor that when executing the computer instructions cause the at least one processor to:
   obtain an original vehicle location of a vehicle;
   determine a threshold radius from the vehicle;
   select one or more public entities within the threshold radius from the original vehicle location;
   determine an entity location of the one or more selected public entities;
   determine a centralized location of the one or more selected public entities based on the determined entity locations of the one or more selected public entities;
   store the centralized location as an anonymized location of the vehicle; and
   discard the original vehicle location.

2. The computing device of claim 1, wherein execution of the computer instructions by the at least one processor further cause the at least one processor to:
   determine that no public entities are within the threshold radius from the original vehicle location; and
   discard the original vehicle location in response to no public entities being determined to be within the threshold radius from the original vehicle location without determining and storing the centralized location.

3. The computing device of claim 1, wherein execution of the computer instructions by the at least one processor further cause the at least one processor to:
   determine if the original vehicle location is within an exclusion zone; and
   discard the original vehicle location in response to the original vehicle location being within the exclusion zone.

4. The computing device of claim 1, wherein execution of the computer instructions by the at least one processor further cause the at least one processor to:
   determine if the original vehicle location is within a residential area; and
   discard the original vehicle location in response to the original vehicle location being within the residential area.

5. The computing device of claim 1, wherein execution of the computer instructions by the at least one processor to store the centralized location as the anonymized location of the vehicle further cause the at least one processor to:
   store a characteristic of the vehicle with the centralized location.

6. The computing device of claim 1, wherein execution of the computer instructions by the at least one processor to store the centralized location as the anonymized location of the vehicle further cause the at least one processor to:
   store the centralized location with a time range of when the original vehicle location of the vehicle was obtained.

7. The computing device of claim 1, wherein execution of the computer instructions by the at least one processor to store the centralized location as the anonymized location of the vehicle further cause the at least one processor to:
   store the centralized location without storing an identifier of the vehicle.

8. The computing device of claim 1, wherein execution of the computer instructions by the at least one processor to store the centralized location as the anonymized location of the vehicle further cause the at least one processor to:
   store the centralized location of the vehicle with a second centralized location of a second vehicle without storing identifiers of the vehicle and the second vehicle.

9. The computing device of claim 1, wherein execution of the computer instructions by the at least one processor to store the centralized location as the anonymized location of the vehicle further cause the at least one processor to:
   transmit the centralized location of the vehicle to a third party without transmitting the original vehicle location and without transmitting an identifier of the vehicle.

10. The computing device of claim 1, wherein execution of the computer instructions by the at least one processor to select the one or more public entities within the threshold radius from the original vehicle location further cause the at least one processor to:
    select the one or more public entities from at least one type of public entity, including: a business, a park, a mall, a public building, or a public monument.

11. The computing device of claim 1, wherein execution of the computer instructions by the at least one processor to select one or more public entities within the threshold radius from the original vehicle location further cause the at least one processor to:
    determine a threshold number of public entities; and
    select a number of public entities less than or equal to the threshold number of public entities that are closest to the original vehicle location while being within the threshold radius from the original vehicle location.

12. The computing device of claim 1, wherein execution of the computer instructions by the at least one processor to determine a threshold radius from the vehicle further cause the at least one processor to:
- determine a first threshold radius from the vehicle;
- determine if a number of public entities within the first threshold radius exceeds a threshold number of public entities; and
- in response to the number of public entities within the first threshold radius failing to meet the threshold number of public entities, select a second threshold radius that is greater than the first threshold radius.

13. The computing device of claim 1, wherein execution of the computer instructions by the at least one processor to obtain the original vehicle location of the vehicle further cause the at least one processor to:
- obtain the original vehicle location in response to the vehicle being in a start-up condition.

14. The computing device of claim 1, wherein execution of the computer instructions by the at least one processor to determine the centralized location of the one or more selected public entities further cause the at least one processor to:
- determine an average longitude of the at least one selected public entity; and
- determine an average latitude of the at least one selected public entity.

15. The computing device of claim 1, wherein execution of the computer instructions by the at least one processor to determine an entity location of the one or more selected public entities further cause the at least one processor to:
- obtain a publicly available address of the one or more selected public entities.

16. A computer-implemented method, comprising:
- determining a vehicle location of a vehicle;
- selecting one or more public entities within a threshold distance from the vehicle location;
- determining a centralized location of the one or more selected entities based on an entity location of the one or more selected public entities; and
- storing the centralized location as an anonymized location of the vehicle without storing the obtained vehicle location.

17. The computer-implemented method of claim 16, further comprising:
- discarding the vehicle location in response to zero entities being within the threshold distance from the vehicle location or the vehicle location being within a residential area.

18. The computer-implemented method of claim 16, wherein storing the centralized location further comprises:
- determining a time associated with the vehicle location;
- selecting a time range associated with the determined time; and
- storing the centralized location to be associated with the selected time range.

19. A system, comprising:
- a public-entity-location database that stores publicly available location data for a plurality of entities;
- a vehicle-location system that determines a current vehicle location of a vehicle; and
- a computing device that includes a memory to store computing instructions and a processor to execute the computing instructions to:
- determine a threshold radius from the vehicle;
- identify entities from the plurality of entities within the threshold radius from the current vehicle location;
- determine a centralized location of the identified entities based on the publicly available location data for the identified entities; and
- maintain the centralized location as an anonymized location of the vehicle without maintaining the current location determined by the vehicle-location system.

20. The system of claim 19, wherein the processor of the computing device further executes the computing instructions to:
- dynamically modify the threshold radius to include a threshold number of entities.

* * * * *